United States Patent [19]

Furui et al.

[11] Patent Number: 5,403,613
[45] Date of Patent: Apr. 4, 1995

[54] METHOD OF PRODUCING CARROT JUICE

[75] Inventors: Hiroyasu Furui; Mitsumasa Yasumoto; Hirohisa Tatsuzawa; Takahiro Inakuma; Yukio Ishiguro, all of Tochigi, Japan

[73] Assignee: Kagome Kabushiki Kaisha, Aichi, Japan

[21] Appl. No.: 154,669

[22] Filed: Nov. 18, 1993

[51] Int. Cl.⁶ .............................................. A23L 2/04
[52] U.S. Cl. .................................. 426/599; 426/319; 426/330.5; 426/489; 426/516; 426/626
[58] Field of Search ............... 426/599, 330.5, 516, 426/489, 626, 319

[56] References Cited

U.S. PATENT DOCUMENTS 3,069,271 12/1962 Gluckstein et al. .................. 426/599
3,366,490 1/1968 Wagner et al. .................. 426/330.5
3,787,589 1/1974 Stephens et al. .................... 426/599

OTHER PUBLICATIONS

Furia et al. 1975. CRC Fenaroli's Handbook of Flavor Ingredients, 2nd Ed. vol. 1, CRC Press, Inc. 18901 Cranwood Pkw., Cleveland, Ohio, p. 309.
Hamilton, L. et al. 1976, Home Canning The Last Word, Countryside Press, Dolphin Books, Doubleday & Co., Garden City, N.Y. p. 39.

Primary Examiner—Helen Pratt
Attorney, Agent, or Firm—Heller, Ehrman, White & McAuliffe

[57] ABSTRACT

Carrot juice is produced by crushing or chopping carrots while spraying them with an aqueous solution of citric acid or lemon juice such that the sprayed amount of citric acid is 0.05–0.5 weight % of the carrots being crushed or chopped, effecting inactivation of enzymes by heating the crushed or chopped carrots, and squeezing the heated carrots to collect juice by means of a counter-rotation twin-screw extruder.

18 Claims, No Drawings

METHOD OF PRODUCING CARROT JUICE

BACKGROUND OF THE INVENTION

This invention relates to a method of producing carrot juice. People drink many kinds of vegetable and fruit juice. For the production of such juice, not only is it necessary that the yield be good but the produced juice must retain the original color and flavor of the vegetable and/or fruit. This invention is in response to such requirement specifically for the production of carrot juice.

According to conventional methods of producing carrot juice, carrots are heated in boiling water for inactivation of enzymes (blanching) and then crushed or grated to squeeze out the juice. For squeezing out the juice in such a process, machines such as a pulper, a screw press, a guinard and a decanter are used either singly or in combination. One of the problems with these conventional production methods is that the juice cannot be squeezed out efficiently because of the structure of the machine for the purpose. Another problem is that the color and flavor elements of original carrots are not extracted efficiently and hence the squeezed liquid is not colored well. Still another problem is that the squeezed liquid acquires an off flavor because it takes a long time for the blanching and its flavor is also adversely affected. In summary, carrot juice of high quality cannot be produced with a high yield by a conventional production method.

In view of the above, U.S. Pat. No. 3,787,589 has disclosed a method of heating carrots in a boiling aqueous solution of an edible acid for inactivation of enzyme, thereafter crushing or grating and using a filter press or the like to squeeze out the juice. Although the juice can be squeezed more efficiently by this method, the improvement is not sufficiently significant. Although the juice obtained by this method contains more color and flavor elements of carrots, the color of the juice is still poor. Although the time required for the blanching has been shortened, the juice retains an off flavor and its flavor is poor because the inactivation of enzymes is still by blanching.

It is therefore an object of the invention to eliminate such problems of conventional methods of producing carrot juice and, in particular, to improve the flavor of the carrot juice by eliminating off flavor from the liquid squeezed from carrots.

SUMMARY OF THE INVENTION

As a result of diligent studies in view of the problems of conventional methods as described above, the present inventors discovered an improved method of producing carrot juice, according to which carrots are sprayed, while they are being crushed or chopped, with an aqueous solution of citric acid or lemon juice with a specified amount of citric acid, and juice is squeezed out from these crushed or chopped carrots by means of a counter-rotation twin-screw extruder after they are heated for inactivation of enzymes.

DETAILED DESCRIPTION OF THE INVENTION

This invention relates to a method of producing carrot juice comprising the steps of crushing or chopping carrots while spraying the carrots being crushed or chopped with an aqueous solution of citric acid or lemon juice such that the amount of citric acid in the sprayed aqueous solution or lemon juice is 0.05–0.5 weight % of the carrots, heating the crushed or chopped carrots to thereby inactivate enzymes, and squeezing the heated carrots by means of a counter-rotation twin-screw extruder.

Carrots to be used in the invention are preliminarily washed and sorted. If necessary, preliminarily peeled carrots may be used. For crushing or chopping such carrots, use may be made of a hammer mill, a crusher, a cutter or the like. It is preferable to crush or chop the carrots into pieces with average size of 3–20 mm, and more preferably 5–10 mm. If the average size becomes less than 3 mm, the efficiency of obtaining juice therefrom tends to become lower when they are squeezed by means of a counter-rotation twin-screw extruder, as will be described below. If the average size of these pieces is greater than 20mm, on the other hand, it becomes more troublesome to transport the pieces from one place to another. In the above, the so-called average size is determined by (1) collecting 50 of the crushed or chopped pieces at random, (2) determining the size of each piece by (2-1) placing it on a horizontal plane such that its longest dimension lies horizontally, (2-2) selecting eight evenly separated points around its circumference as seen vertically downward from above, (2-3) measuring the lengths of the four line segments connecting (or the horizontal distances between) pairs of mutually opposite ones of these points, say, by using calipers from above, and (2-4) calculating the average of these four measured lengths and defining it to be the size of this piece, and (3) calculating the average of the sizes of these 50 collected pieces.

While carrots are being crushed or chopped, they are sprayed with an aqueous solution of citric acid or lemon juice such that the amount of citric acid therein which is sprayed is 0.05–0.5 weight %, and more preferably 0.1–0.2 weight %, of the crushed or chopped carrots. This is for the purpose of inhibiting enzymatic reactions. Lemon juice to be used may be obtained by squeezing fresh lemons. Use may as well made of a condensed liquid obtained therefrom, or an aqueous solution of such a condensed liquid. If the sprayed amount of citric acid is less than 0.05 weight %, enzymatic reactions cannot be inhibited adequately. If the citric acid content exceeds 0.5 weight %, on the other hand, enzymatic reactions can be inhibited but the carrot juice which is finally obtained becomes too strongly acid. Although the use of organic acids such as lactic acid and acetic acid may be considered for the purpose of inhibiting enzymatic reactions, these organic acids are not in harmony with the unique flavor of carrot juice.

It is also effective to use salt water for spraying for the same purpose of using citric acid. For increasing the amount of color elements, or pigments (such as carotinoid), which can be extracted from carrots, a spray of ethyl alcohol is effective. When salt water is sprayed, it is done with the spray of an aqueous solution of citric acid or lemon juice such that the salt content of the salt water is 0.1–1.0 weight %, and more preferably 0.3–0.7 weight %, of the crushed or chopped carrots. When ethyl alcohol is sprayed, it is done with the spray of an aqueous solution of citric acid or lemon juice such that the content of ethyl alcohol is 0.5–3 weight %, and more preferably 0.7–1.5 weight %, of the crushed or chopped carrots. Both salt water and ethyl alcohol may be sprayed simultaneously with the spray of the aqueous solution of citric acid or lemon juice. The ranges of the rates at which salt water and/or ethyl alcohol may be used, are determined not only in view of how they can serve their purposes but also how they affect the unique flavor and color of carrot juice.

The crushed or chopped carrot pieces thus obtained are heated for inactivation of enzymes. For this heating process, it is preferable to use a sealed system such as a contherm because qualities unique to carrots can be retained and unwanted off flavor can be kept away by heating quickly inside a sealed system. The heating is usually carried out such that the temperature of the carrot pieces reaches 80°–90° C., and more particularly 85° C.

After this process for inactivation of enzymes, the heated carrot pieces are squeezed by a counter-rotation twin-screw extruder to produce juice. The counter-rotation twin-screw extruder to be used according to the present invention may be characterized as having two mutually parallel shafts adapted to rotate in mutually opposite directions. Each shaft is provided with screws such that the screws on the two shafts engage each other. These screws are surrounded by a barrel having slits or a screen net such that crushed or chopped carrot pieces thrown into this barrel are transported by the mutually engaging counter-rotation twin screws from an inlet end to an outlet end. In the meantime, the pieces are squeezed and the juice thus obtained are collected through the slit or the screen net.

Co-rotation twin-screw extruders are being used for extracting vegetable oil from oil-producing seeds (as disclosed, for example, in U.S. Pat. No. 3,450,034), but the rate of obtaining juice becomes lower in the case of carrot juice if a co-rotation twin-screw extruder is used.

When a counter-rotation twin-screw extruder is used according to the present invention, a plurality of screws, etc. are usually mounted continuously on each of the two counter-rotation twin screws. Examples of screws which may be thus mounted include parallel screws, tapered screws, reverse screws and tapered collars. The combination of such screws also affects the rate of collecting juice and the quality of the juice which is squeezed. They may be combined from the inlet end to the outlet end in the order of parallel screw - parallel screw - tapered collar - parallel screw - tapered screw - tapered screw - tapered collar. A preferable combination is in the order of parallel screw - parallel screw - tapered collar - parallel screw - tapered screw - reverse screw - tapered collar such that a reverse screw is included between the center and the outlet end. The reverse screw serves to apply pressure on the carrot pieces in the direction opposite to the direction of their transportation and this tends to improve the rate of juice collection and the quality of squeezed juice.

In order to improve the rate of juice collection by the squeezing process, it is preferable to cause a heating medium such as steam to flow through a hollow portion created in the barrel and/or the screws so as to heat the carrot pieces as they are being squeezed for juice collection. In order to improve the quality of the squeezed juice, furthermore, it is preferable to collect the juice in a nitrogen atmosphere. Carrot juice with superior color and flavor can be obtained if the counter-rotation twin-screw extruder is placed inside an enclosure, the interior of the enclosure being filled with nitrogen and a nitrogen gas being supplied through the inlet for the crushed or chopped carrots.

In order to further explain the present invention and its effects more clearly, test examples and comparison examples will be described below, but it goes without saying that the invention is not limited by these test examples.

PART 1 (Production of Carrot Juice)

Test Example 1

Commercially available carrots were peeled and washed with water. They were crushed into small pieces (of average size less than 2.0 mm) by a crusher while they were sprayed with an aqueous solution of citric acid (with citric acid content of 10.0 weight %) such that citric acid would be 0.15 weight % of the crushed carrots. Next, the crushed carrots thus obtained were supplied to a contherm (Model KV-12 produced by Iwai Kikai Kogyo-sha) and heated to 85° C. for inactivation of enzymes. They were then squeezed by a counter-rotation twin-screw extruder to collect juice and the juice was cooled. The slit in the barrel of the extruder was 0.5 mm in width and the screws were rotated at the rate of 10 rpm. In the extruder, the screws were arranged according to the Screw Pattern A given below:

Screw Pattern A: (Inlet side) - parallel screw with length 150 mm and groove depth of 15 mm - parallel screw with length 100 mm and groove depth 10 mm tapered collar - parallel screw with length 60 mm and groove depth 6 mm - tapered screw with length 50 mm and groove depth 5 mm - tapered screw with length 40 mm and groove depth 4 mm - tapered collar - (outlet side).

Test Example 2

Commercially available carrots, the same as used in Test Example 1, were peeled and washed with water. They were crushed into small pieces of average size 8.5 mm by a crusher while they were sprayed with an aqueous solution of citric acid (with citric acid content of 5.0 weight %) such that citric acid would be 0.15 weight % of the crushed carrots. Inactivation of enzymes was carried out thereafter as in Test Example 1, and juice was squeezed by a counter-rotation twin-screw extruder and cooled.

Test Example 3

Commercially available carrots, the same as used in Test Example 1, were peeled and washed with water. They were chopped into small pieces of average size 12.7 mm by a cutter while they were sprayed with an aqueous solution of citric acid (with citric acid content of 5.0 weight %), salt water (with salt content of 10.0 weight %) and ethyl alcohol such that the sprayed amount of citric acid, salt and ethyl alcohol would be respectively 0.15 weight %, 0.3 weight % and 0.8 weight % of the crushed carrots. Inactivation of enzymes was carried out thereafter as in Test Example 1, and juice was squeezed by a counter-rotation twin-screw extruder and cooled.

Test Example 4

Commercially available carrots, the same as used in Test Example 1, were peeled and washed with water. They were crushed into small pieces of average size 9.5 mm by a crusher while they were sprayed with a 10-times diluted aqueous solution obtained from commercially available condensed lemon juice (condensed 6 times, citric acid content of 36.0 weight such that the sprayed amount of citric acid would be 0.15 weight % of the crushed carrots. Inactivation of enzymes was carried out thereafter as in Test Example 1, and juice was squeezed by a counter-rotation twin-screw extruder and cooled. In this process, the extruder was placed inside an enclosure, the interior of which was filled with nitrogen, and nitrogen was supplied into the extruder through its inlet for crushed carrots.

Test Example 5

Commercially available carrots, the same as used in Test Example 1, were peeled and washed with water. They were crushed into small pieces of average size 9.5 mm by a crusher while they were sprayed with a 5-times diluted aqueous solution obtained from the same commercially available condensed lemon juice (as used in Test Example 4) such that the sprayed amount of citric acid would be 0.15 weight % of the crushed carrots. Inactivation of enzymes was carried out thereafter by using the contherm (as in Test Example 1) and heating the crushed carrots to 85° C. Juice was squeezed by a counter-rotation twin-screw extruder and cooled. The slit in the barrel of the extruder was 0.5mm in width and the screws were rotated at the rate of 10 rpm. In the extruder, the screws were arranged according to the Screw Pattern B given below:

Screw Pattern B: (Inlet side) - parallel screw with length 150 mm and groove depth of 15 mm - parallel screw with length 100 mm and groove depth 10 mm tapered collar - parallel screw with length 60 mm and groove depth 6 mm - tapered screw with length 50 mm and groove depth 5 mm - reverse screw with length 40 mm and groove depth 4 mm - tapered collar - (outlet side).

Test Example 6

Commercially available carrots, the same as used in Test Example 1, were peeled and washed with water. They were crushed into small pieces of average size 9.5 mm by a crusher while they were sprayed with a 5-times diluted aqueous solution obtained from the same commercially available condensed lemon juice (as used in Test Example 4), salt water (with salt content of 10.0 weight %) and ethyl alcohol such that the sprayed amounts of citric acid, salt and ethyl alcohol would be respectively 0.15 weight %, 0.3 weight % and 0.8 weight % of the crushed carrots. Inactivation of enzymes was carried out thereafter as in Test Example 5, and juice was squeezed by a counter-rotation twin-screw extruder and cooled. The juice was squeezed in a nitrogen atmosphere as done in Test Example 4.

Comparison Example 1

Commercially available carrots, the same as used in Test Example 1, were washed with an alkali and then with water. They were subjected to a blanching process for inactivation of enzymes inside hot water of 90°-95° C., cooled and peeled. They were crushed and grated by a hammer mill and squeezed by a decanter to collect juice.

Comparison Example 2

It was the same as Comparison Example 1 except use was made of a co-rotation twin-screw extruder (as described in U.S. Pat. No. 3,450,034) instead of a counter-rotation twin-screw extruder.

Comparison Example 3

Commercially available carrots, the same as used in Test Example 1, were peeled and washed with water. They were soaked in boiling aqueous solution of citric acid with content of 5 weight % (0.078 N) for 5 minutes (for blanching), and they were squeezed to collect juice after being crushed by a filter press.

Comparison Example 4

Commercially available carrots, the same as used in Test Example 1, were peeled and washed with water. They were crushed into small pieces of average size 9.5 mm by a crusher while they were sprayed with a 10-times diluted aqueous solution obtained from commercially available condensed lemon juice (the same as used in Test Example 4) such that the sprayed amount of citric acid would be 0.03 weight % of the crushed carrots. Inactivation of enzyme was effected as in Test Example 1. After juice was obtained by a counter-rotation twin-screw extruder, it was cooled.

Comparison Example 5

Commercially available carrots, the same as used in Test Example 1, were peeled and washed with water. They were crushed into small pieces of average size 9.5 mm by a crusher while they were sprayed with a 5-times diluted aqueous solution obtained from commercially available condensed lemon juice (the same as used in Test Example 4) such that the sprayed amount of citric acid would be 0.70 weight % of the crushed carrots. Inactivation of enzyme was effected as in Test Example 1. After juice was obtained by a counter-rotation twin-screw extruder, it was cooled.

Part 2 (Evaluation)

Table 1 shows the juice collection efficiency (weight %), color, total flavor, quantity of carotinoid (mg %) and the result of sensory evaluation for each of the examples. The measurements and evaluations were carried out as follows:

Juice Collection Efficiency (weight %)

This is defined as 100 ×(Quantity of juice obtained by squeezing)/(quantity of carrots before peeling).

Color

Hunter-type color-difference meter (Model No. ND-Σ80 produced by Nippon Denshoku Kogyo-sha) was used. L indicates brightness. The larger the value of L, the brighter. Quotient a/b indicates color. The larger the value of a/b, the redder is the overall coloring.

Total flavor

Gases collected by a purge and trap method were analyzed by high performance liquid chromatography, and the total area under its peak was measured. The total area for Comparison Example 1 was defined as 1.0 and relative total areas for other examples were calculated.

Quantity of carotinoid (mg %)

Measured by high performance liquid chromatography.

Sensory evaluation

Twenty panelists including ten men and ten women evaluated each example relative to Comparison Example 3 by a 2-point comparison method, determining which was favored. Numbers in Table 1 indicate the number of persons who answered that the other example is preferred to Comparison Example 3. Symbols * and ** respectively indicate significant error of 1% and 0.1%. Comparison Examples 1 and 2 could not be evaluated because the collected amounts of juice were too small.

As clearly shown in Table 1, the favorable effects of the present invention include the following:
(1) Juice can be collected efficiently;
(2) Pigments and flavors unique to carrots can be efficiently extracted into the squeezed juice and the coloring as a whole is good; and
(3) The collected juice has no off flavor and its flavor is good as a whole.

As a result, the present invention makes it possible to produce carrot juice of high quality at an improved yield.

TABLE 1

|  | Test Examples | | | | | | Comparison Examples | | | | | | | |
| --- | --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 | 8 |
| Juice collection Efficiency (Weight %) | 66 | 68 | 69 | 68 | 77 | 78 | 56 | 53 | 60 | 64 | 65 | 58 | 45 | 54 |
| Color L | 33 | 35 | 37 | 37 | 35 | 37 | 30 | 32 | 33 | 31 | 35 | 33 | 29 | 30 |
| a/b | 1.20 | 1.25 | 1.33 | 1.25 | 1.25 | 1.35 | 1.13 | 1.15 | 1.15 | 1.15 | 1.25 | 1.15 | 1.00 | 1.05 |
| Total flavor | 1.4 | 1.5 | 1.7 | 1.7 | 1.5 | 1.7 | 1.0 | 1.4 | 1.3 | 1.4 | 1.5 | 1.4 | 0.8 | 0.9 |
| Carotinoid (mg %) | 3.8 | 4.7 | 5.3 | 4.7 | 4.9 | 5.5 | 3.6 | 3.6 | 3.8 | 4.0 | 4.7 | 3.8 | 2.5 | 2.8 |
| Sensory evaluation | 16* | 18** | 18** | 18** | 18** | 19** | — | — | — | 7 | 5 | — | — | — |

What is claimed is:

1. A method of producing carrot juice comprising the steps of:
   crushing or chopping carrots while spraying said carrots with an aqueous solution of citric acid or lemon juice such that the sprayed amount of citric acid from said aqueous solution or lemon juice is 0.05–0.5 weight % of said carrots being crushed or chopped;
   effecting inactivation of enzyme by heating said crushed or chopped carrots; and
   causing said heated carrots to move longitudinally inside an enclosure enclosing a pair of mutually parallel counter-rotating screws to thereby squeeze juice out of said heated carrots.

2. The method of claim 1 wherein said carrots are crushed or chopped to pieces of average size 3–20 mm.

3. The method of claim 2 wherein the step of crushing or chopping carrots is effected while simultaneously spraying said carrots with salt water, as well as said aqueous solution of citric acid or lemon juice, such that the sprayed amount of salt is 0.1–1.0 weight % of said carrots being crushed or chopped.

4. The method of claim 2 wherein the step of crushing or chopping carrots is effected while simultaneously spraying said carrots with ethyl alcohol, as well as said aqueous solution of citric acid or lemon juice, such that the sprayed amount of ethyl alcohol is 0.5–3 weight % of said carrots being crushed or chopped.

5. The method of claim 2 wherein the step of crushing or chopping carrots is effected while simultaneously spraying said carrots with salt water and ethyl alcohol, as well as said aqueous solution of citric acid or lemon juice, such that the sprayed amounts of salt and ethyl alcohol are respectively 0.3–0.7 and 0.7–1.5 weight % of said carrots being crushed or chopped.

6. The method of claim 5 further comprising the step of providing an atmosphere of nitrogen gas inside said enclosure.

7. The method of claim 6 wherein said heated carrots are caused to travel generally forward from an inlet end to an outlet end inside said enclosure and to be pushed backwards at a specified region inside said enclosure, said specified region being closer to said outlet end than to said inlet end.

8. The method of claim 5 wherein said heated carrots are caused to travel generally forward from an inlet end to an outlet end inside said enclosure and to be pushed backwards at a specified region inside said enclosure, said specified region being closer to said outlet end than to said inlet end.

9. The method of claim 2 further comprising the step of providing an atmosphere of nitrogen gas inside said enclosure.

10. The method of claim 2 wherein said heated carrots are caused to travel generally forward from an inlet end to an outlet end inside said enclosure and to be pushed backwards at a specified region inside said enclosure, said specified region being closer to said outlet end than to said inlet end.

11. The method of claim 2 wherein said aqueous solution or lemon juice is sprayed such that the sprayed amount of citric acid in said aqueous solution or lemon juice is 0.1–0.2 weight 12. The method of claim 11 further comprising the step of providing an atmosphere of nitrogen gas inside said enclosure. % of said carrots being crushed or chopped.

13. The method of claim 11 wherein said heated carrots are caused to travel generally forward from an inlet end to an outlet end inside said enclosure and to be pushed backwards at a specified region inside said enclosure, said specified region being closer to said outlet end than to said inlet end.

14. The method of claim 1 wherein said aqueous solution or lemon juice is sprayed such that the sprayed amount of citric acid in said aqueous solution or lemon juice is 0.1–0.2 weight % of said carrots being crushed or chopped.

15. The method of claim 4 further comprising the step of providing an atmosphere of nitrogen gas inside said enclosure.

16. The method of claim 14 wherein said heated carrots are caused to travel generally forward from an inlet end to an outlet end inside said enclosure and to be pushed backwards at a specified region inside said enclosure, said specified region being closer to said outlet end than to said inlet end.

17. The method of claim 1 further comprising the step of providing an atmosphere of nitrogen gas inside said enclosure.

18. The method of claim 1 wherein said heated carrots are caused to travel generally forward from an inlet end to an outlet end inside said enclosure and to be pushed backwards at a specified region inside said enclosure, said specified region being closer to said outlet end than to said inlet end.

* * * * *